Dec. 5, 1939.  T. T. THIGPEN  2,182,415
DEVICE FOR FILLING FLUID TANKS
Filed May 20, 1939  4 Sheets-Sheet 1
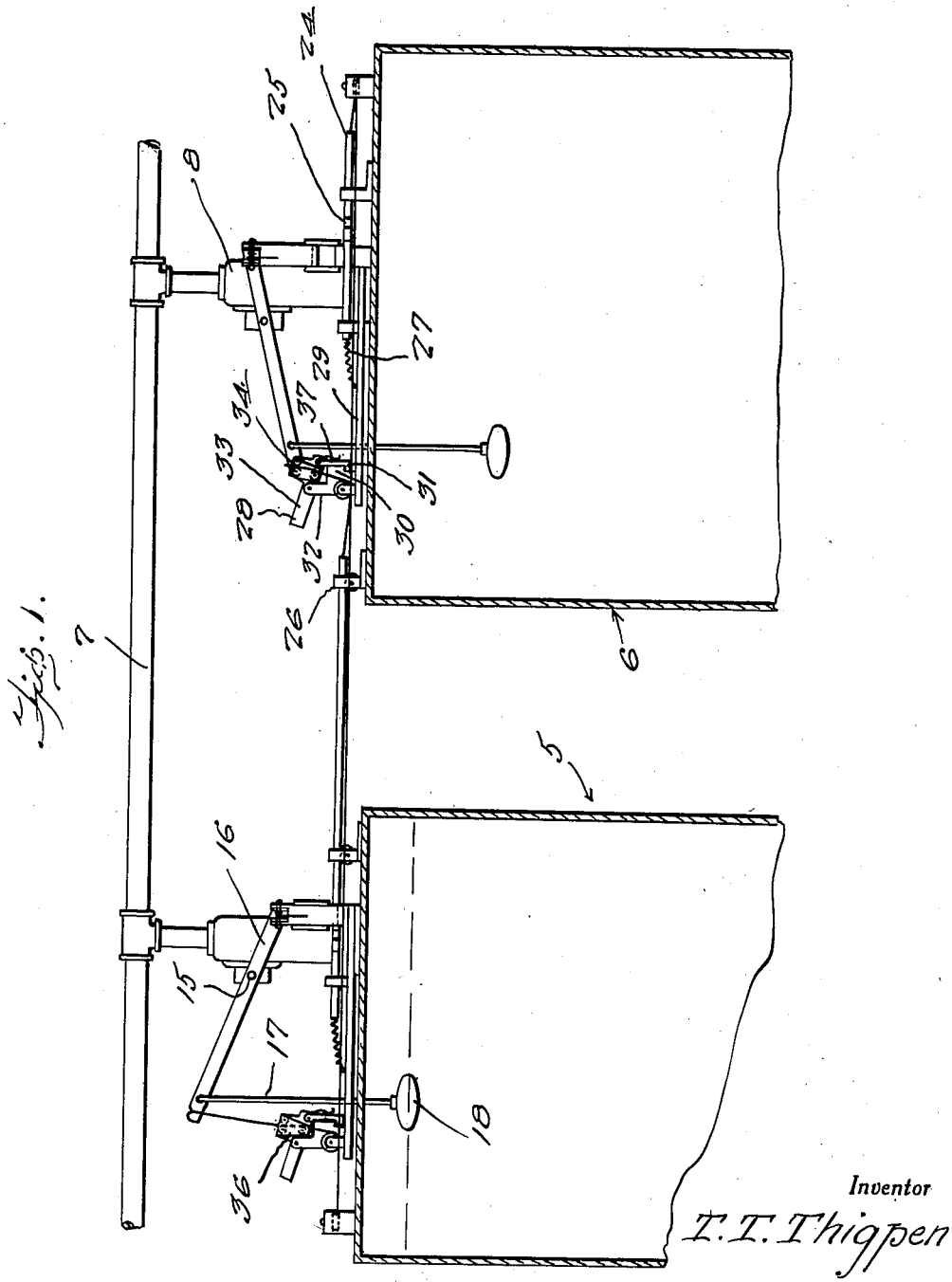
Inventor
T. T. Thigpen
By Clarence A. O'Brien
and Hyman Berman
Attorneys

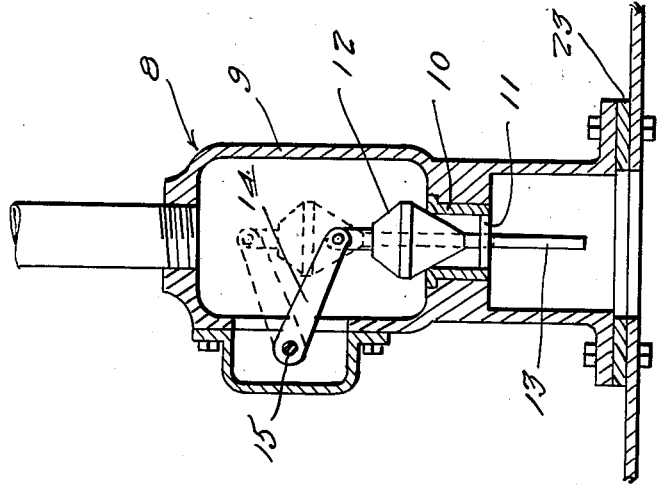
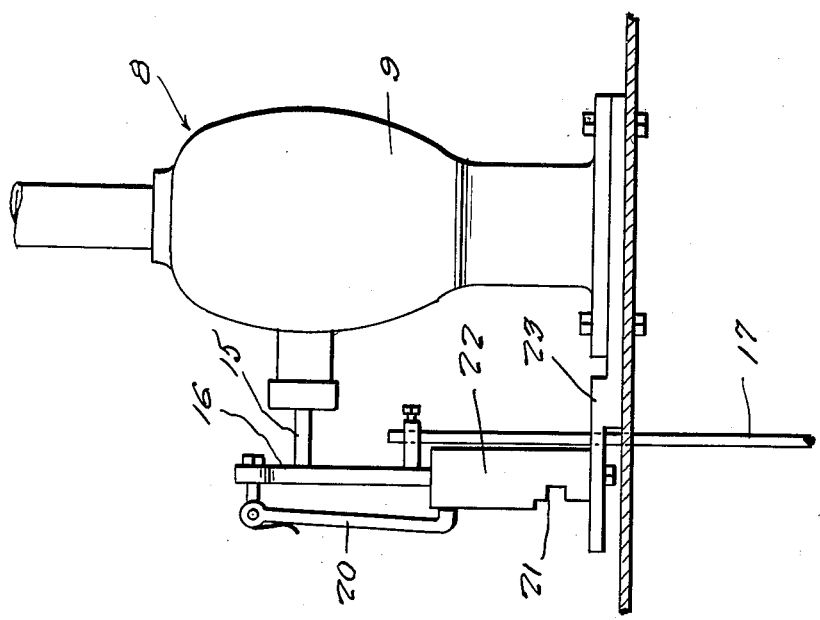

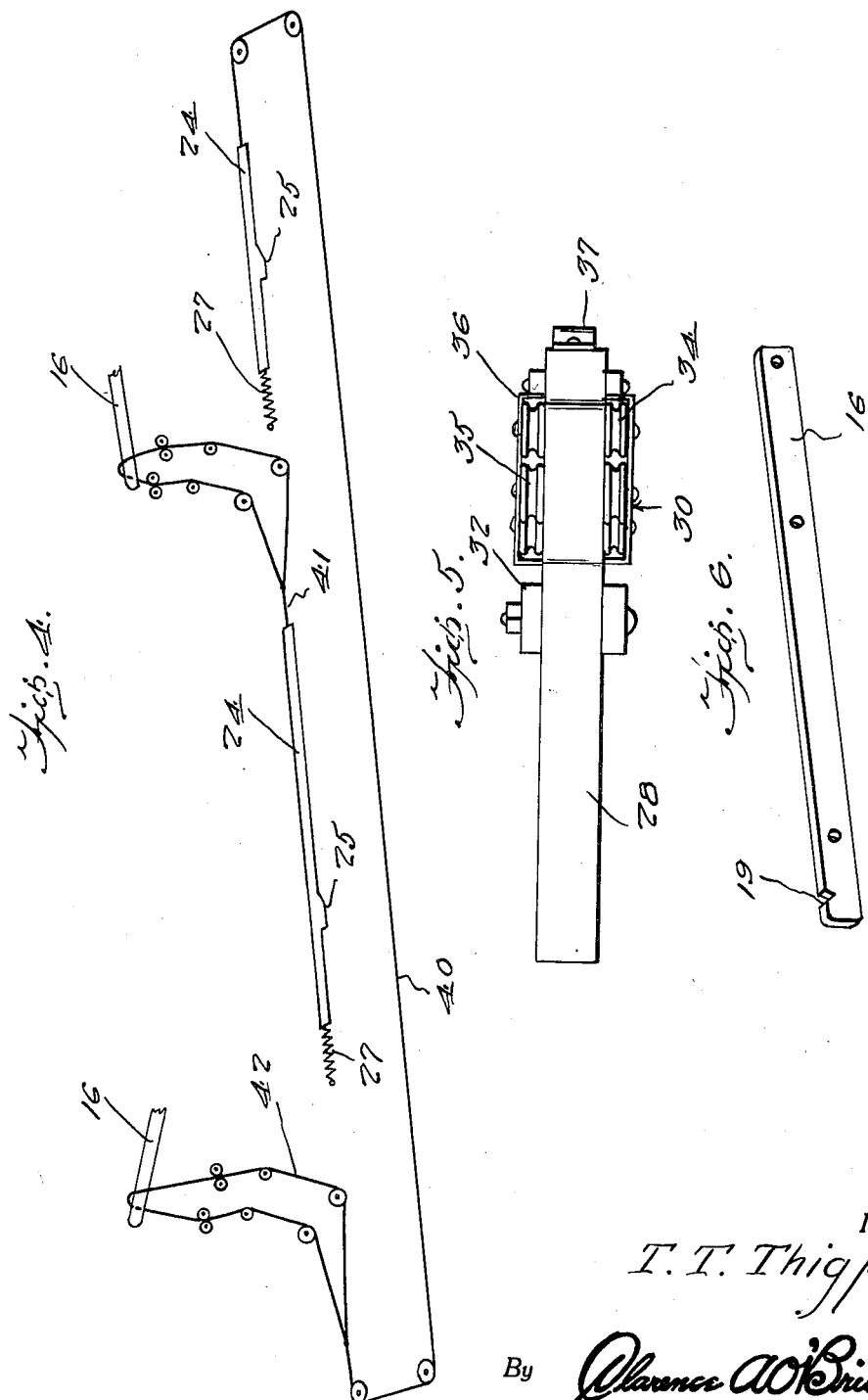

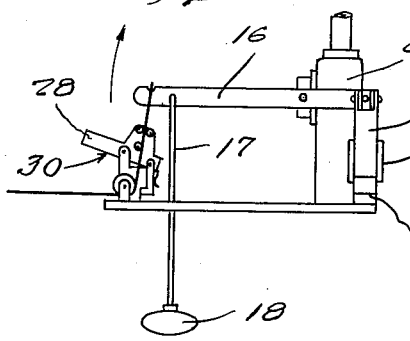
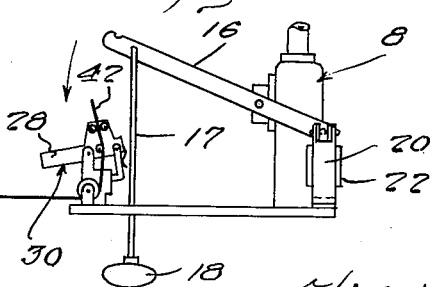
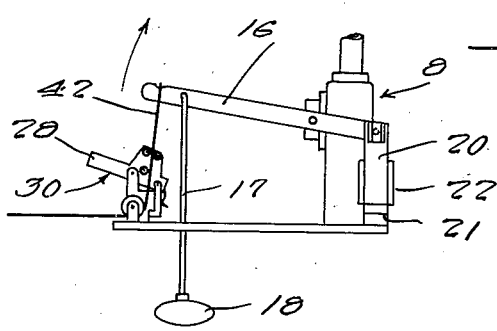
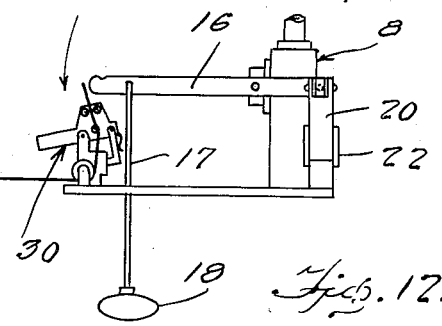
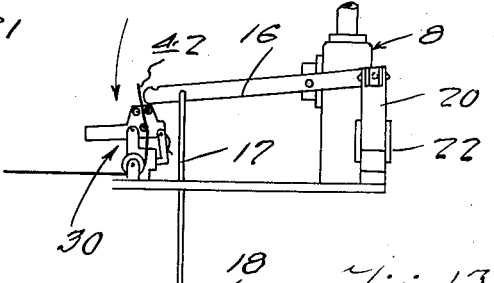
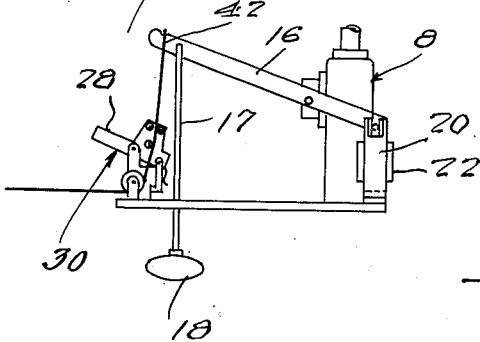
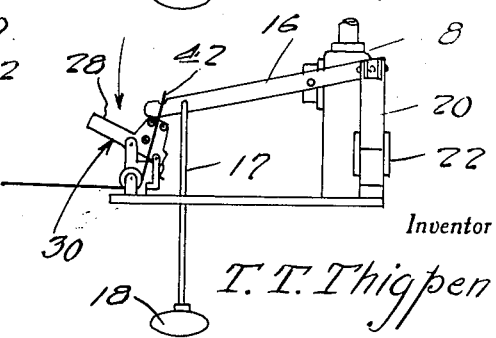

Patented Dec. 5, 1939

2,182,415

UNITED STATES PATENT OFFICE 2,182,415

DEVICE FOR FILLING FLUID TANKS

Thelma T. Thigpen, Salem, Ill., assignor of forty per cent to J. M. Plummer, Salem, Ill.

Application May 20, 1939, Serial No. 274,814

6 Claims. (Cl. 137—68)

This invention relates to a device for filling a series of tanks or other similar devices with fluid from a common source or pipeline, and has for the primary object the provision of a device of this character wherein a series of tanks are connected to a pipe supply line by valves forming a part of this invention and means for the operation of said valves whereby one tank after another may be filled with fluid from said pipe supply line and to automatically close the tank to the pipe line as filled and automatically open the next tank to said pipe line for filling and so on until all tanks are filled and each closed to the pipe line whereby the entire operation may be carried out with safety and quickness and with an expenditure of a minimum amount of manual attention.

With these and other objects in view, the invention consists in certain novel features of construction, combination and arrangement of parts to be hereinafter more fully described and claimed.

For a complete understanding of my invention, reference is to be had to the following description and accompanying drawings, in which:

Figure 1 is a fragmentary vertical sectional view illustrating a pair of tanks equipped with the present invention and connected to a common supply pipe line.

Figure 2 is a fragmentary elevational view partly in section showing one of the control valves and a latch means therefor.

Figure 3 is a vertical sectional view illustrating one of the control valves.

Figure 4 is a diagrammatical view showing the arrangement of cables and trip slides forming a part of the invention.

Figure 5 is a top plan view illustrating a trip lever.

Figure 6 is a perspective view illustrating a valve lever.

Figure 7 is a diagrammatical view showing one of the valve levers moving upwardly, due to one of the tanks beginning to fill with fluid, toward a position of closing the valve.

Figure 8 is a view similar to Figure 7 showing the valve lever nearing a position of closing the valve.

Figure 9 is a view similar to Figure 8 showing the valve lever reaching a position of closing the valve.

Figure 10 is a diagrammatical view showing the valve lever just starting its movement in a direction of opening the valve.

Figure 11 is a position of the valve lever when it has completed approximately half of its movement toward opening the valve.

Figure 12 is a view similar to Figure 11 showing the valve lever nearing the completion of opening the valve and engaging with a latch mechanism.

Figure 13 is a view similar to Figure 12 showing the valve lever reaching a position of fully opening the valve and moving the latch mechanism into latched position.

Referring in detail to the drawings, the numerals 5 and 6 indicate a pair of tanks to be filled with fluid from a supply pipeline 7 through the use of the present invention. While a pair of tanks is shown for the illustration of the present invention, it is to be understood that any number of tanks can be successfully filled one after another through the use of this invention and each tank automatically closed to the supply line when filled and automatically opening the next tank to the supply line.

The tanks 5 and 6 have their upper ends connected to the supply pipe line 7 by valves 8 each consisting of a housing 9 in which is formed a seat 10 including a spider 11. A substantially conical-shaped valve element 12 coacts with the seat and includes a guide pin 13 slidable through the spider 11 for the purpose of centering the valve element 12 with respect to the seat 10. The valve element is pivotally connected to a lever 14 secured on a shaft 15 journaled in an offset portion of the housing 9. The offset portion of the lever 14 is in the form of a packing gland to establish a tight fit with the shaft 15 and the latter has secured thereto a valve lever 16. The connection of the valve lever to the shaft 15 is closer to one end than to the other end. The longest end of the valve lever has swivelly connected thereto a stem 17 of a float 18. Also the longest end of the lever is provided with a cable engaging notch 19.

By referring to Figure 1 it will be seen that the stems 17 of the floats extend through the top walls of the tanks with the floats operating within the tanks. The weight of the floats when the tanks are empty is sufficient to move the levers in a downward direction for the purpose of unseating the valve elements and thereby place the tanks in communication with the pipe line 7. However, when the tanks become filled the floats elevate the levers and bring about seating of the valves 12 and consequently closing the tanks to the supply line.

Each lever on its shortest end has pivoted thereto a spring influenced catch 20 adapted to coact with a notch or keeper 21 formed in a support block 22 for the purpose of locking the lever in a position of closing the valve. As the shortest end of the lever moves downwardly for closing the valve the catch moves into the keeper and thereby establishes locking of the lever in a position of closing the valve. The supporting blocks 22 are mounted on plates 23 carried by the top walls of the tanks being clamped between said top walls and the base flanges of the valve housing, as clearly shown in Figure 2. The plates 23 project beyond the supporting blocks for the purpose of providing guides for trip slides 24 each provided with a lug 25 capable of moving into a keeper notch for the purpose of dislodging therefrom the catch 20 to free the valve lever so that the weight of the float when the tank is empty will bring about opening of the valve to that tank. The trip slides are slidably mounted in hangers 26 provided on the tanks which may include rollers for reducing friction if desired. Coiled springs 27 are connected to the trip slides for urging the latter in one direction.

Trip latches 28 are carried by supporting plates 29 secured on the tanks and each includes a keeper element or block 30 having a notch 31 and an extension 32, to which a trip lever 33 is pivoted. The trip lever includes a head 34 having journaled on opposite sides thereof a series of pulleys 35 each provided with a guard strip 36. A catch 37 is pivoted on the head of the trip lever 33 and is spring influenced to ride against the keeper block 30 to enter the keeper notch 31 when the trip lever 33 is swung upwardly.

As shown in Figure 4 one of the trip slides has connected to one end thereof a cable 40 and the other trip slide has connected thereto a cable 41. The cables at their free ends are provided with loop portions 42 trained over the pulleys of the heads 34 of the trip levers 33 for the purpose of engaging the notches 19 of the valve levers 16 during certain positions of said valve levers. The guard strips 36 are for the purpose of preventing disengagement of the loop portions 41 of the heads of the trip levers 33 when disengaged from the valve levers. It is to be understood that the trip slides are so positioned by the springs 27 that the lugs 25 are out of the keeper notches 21 when the loop portions of the flexible elements are disengaged from the valve levers and only in engagement with the heads of the trip levers 33.

In operation, the operator of the device first positions the trip levers 33 of all the tanks in a downward direction by disengaging the catches 37 from the keeper notches 31. An illustration of this position is shown in Figures 10 to 12, inclusive, of the drawings. The loop portions of the flexible elements are then disengaged from the valve levers and only engage with the heads of the trip levers 33 so as to be in a position to be engaged by the valve levers when the latter move downwardly under the influence of the weight of the floats and contact the heads of the trip levers 33 and bring about pivotal movement thereof to engage the latches thereof with the keeper notches, this being shown clearly in Figures 12 and 13. In Figure 12 the valve lever is just engaging the head and in Figure 13 the valve lever has pushed the head downwardly bringing the loop portion of the flexible element into engagement with the notch of said valve lever. The operator then latches one of the valve levers in valve closing position by engaging the catch 20 thereof with its keeper and the other valve lever is freed so that the float thereof will pull the latter-named valve lever downwardly to open the valve and admit fluid to one of the tanks and as the fluid fills said tank the float rises, moving the valve lever upwardly to assume a position of closing the valve. However, as the latter-named valve lever moves downwardly on being manually freed it engages the head of one of the trip levers 33 and imparts pivotal movement to bring about engagement of the spring influenced latch with its keeper and the positioning of the loop portion of one of the flexible elements in engagement with the notch of said lever. As before stated, as this lever moves upwardly due to the filling of the tank under the influence of the float to bring about closing of the valve on the filling of said tank with the fluid the flexible element connected with said lever pulls the slide to which it is connected on the valve assuming closed position for the purpose of releasing the latch 20 from its keeper of the other valve lever freeing said valve lever for gravitation under the influence of its weight and as this second valve lever moves to its lowermost position it engages with the head of the other trip lever 33 and brings about latching thereof and the engagement of the loop portion of the other cable with the latter-named valve lever so that as the latter-named valve lever moves upwardly the latter-named flexible element is operated or pulled to move the slide connected thereto for operating the valve lever latch of the next tank, when the second tank becomes full and its valve closed. Thus it will be seen as each tank becomes filled with fluid the valve of that tank is automatically closed to the pipe line and the valve of the adjacent or next tank is automatically released and permitted to assume an open position under the influence of the weight of the float to which it is connected and as the second tank fills with fluid from the pipe line it in turn is closed to said pipe line due to its valve being closed by the action of the float and which brings about releasing of the valve of the next tank and so on until all tanks have been completely filled. As each valve assumes a closed position the latch 20 thereof engages with its keeper consequently locking the valve in a closed position, requiring the operation of the latch 20 from its keeper before the valve can again assume an open position. This latch 20 will be manually operated to first set the device in operation and then automatically operated through the trip slide associated therewith and effected by the closing of the preceding valve.

In Figure 10 the valve lever is in a position to close the valve ready to start on its downward movement under the influence of the float when freed. In Figure 5 the valve lever has been freed from the position of closing the valve and is moving downwardly and in Figure 12 the valve lever is moving into contact with the latch head and in Figure 13 has imparted pivotal movement to the latch head bringing the loop portion of one of the flexible elements into the notch thereof. The valve lever when in this position, as shown in Figure 13, has completely opened the valve. In Figure 7 the float is rising with the fluid with the lever moving upwardly toward the position of closing the valve also in Figure 8 the valve lever is moving upwardly and is shown closer to a valve closing position than that shown in Figure 7. In Figure 9 the valve lever has completed its upward movement and has completely closed the valve and moving the slide connected thereto to its maximum distance for the purpose of releasing the catch 20 of the next valve for the purpose of opening the next tank to the pipe line. As the valve lever reaches a valve closing position the catch 20 thereof moves in engagement with its keeper and brings about the locking of the valve in a closed position after the tank has been filled, the trip lever 33 still remaining in a latched position requiring manual release from this position before the device is again set in operation.

From the foregoing description taken in connection with the accompanying drawings it will be seen that a simple and compact arrangement has been provided whereby one tank after another may be safely and quickly filled with fluid from a supply line and as each tank becomes filled it is automatically closed to the supply line and the next tank automatically opened to the supply line for filling. This arrangement permits a large number of tanks to be rapidly, efficiently and safely filled one at a time from a common supply line.

It is believed that the foregoing description when taken in connection with the drawings, will fully set forth the construction and advantages of this invention to those skilled in the art to which such a device relates, so that further detailed description will not be required.

What I claim is:

1. In a device of the character set forth including a plurality of fluid receiving tanks and a fluid supply line, valves connecting said tanks to the supply line, floats in said tanks, means connecting said floats to the valves for opening said valves under the weight of said floats when the tanks are empty of fluid and for closing said valves on the tanks becoming filled with fluid, latch means coacting with said first means for locking the valves closed, and means for releasing said latch means of one valve to permit opening of the latter by another valve moving into closed position whereby one tank after another may be filled with fluid from said supply line and closed to the latter after being filled.

2. In a device of the character set forth including a plurality of fluid receiving tanks and a fluid supply line, valves connecting said tanks to the supply line, floats operating in said tanks, levers connected to said valves, float stems connecting the floats to said levers whereby said floats may open the valves under the weight of the floats when said tanks are empty of fluid and for closing said valves on the tanks becoming filled with fluid, latch means coacting with said levers for locking the valves closed, and means for releasing said latch means of one of the valves to permit opening of the latter by another valve moving into closed position whereby one tank after another may be filled with fluid from said supply line and closed to the latter after being filled.

3. In a device of the character set forth including a plurality of fluid receiving tanks and a fluid supply line, valve housings connecting said tanks to the supply line, valve elements operating in said housings, levers connected to said valve elements, floats operating in said tanks, means connecting the floats to the levers for opening said valves under the weight of the floats when the tanks are empty of fluid and for closing said valves on the tanks becoming filled with fluid, latch means connected with said levers for latching the valves in closed position, and means for releasing the latch means of one of the valves to permit opening of the latter by another valve moving into closed position whereby one tank after another may be filled with fluid from said supply line and closed to the latter after being filled.

4. In a device of the character set forth including a plurality of fluid receiving tanks and a fluid supply line, valves connecting said tanks to the supply line, floats operating in said tanks, levers connected with said valves, means connecting said floats to the levers for opening said valves under the weight of said floats when the tanks are empty of fluid and for closing said valves on the tanks becoming filled with fluid, latch mechanism connected with said levers for locking the valves in closed position, slides for operating said latch mechanism, and means connected with said slides for connection and disconnection with the levers.

5. In a device of the character set forth including a plurality of fluid receiving tanks and a fluid supply line, valves connecting said tanks to the supply line, floats operating in said tanks, levers connected with said valves, means connecting said floats to the levers for opening said valves under the weight of said floats when the tanks are empty of fluid and for closing said valves on the tanks becoming filled with fluid, latch mechanisms connected with said levers for locking the valves in closed position, slides for operating said latch mechanisms, flexible elements connected to said slides, springs influencing the slides in one direction, trip levers pivotally mounted in the path of movement of the valve levers moving into valve opening position and including catches for the securing thereof and having the flexible elements trained thereover to engage with the valve levers on the engagement of the latter with the trip mechanisms.

6. A device of the character set forth including a plurality of fluid receiving tanks and a fluid supply line, valves connecting said tanks to the supply line, floats operating in said tanks, levers connected with said valves, means connecting said floats to the valve levers, catches connected with said levers for releasably securing the levers in position of closing said valves, slides for releasing said catches, springs influencing said slides in one direction, flexible elements connected to said slides, said flexible elements including loop portions, pivotally mounted trip mechanism located in the path of movement of the valve levers and including catches for the securing thereof and adapted to be engaged by the levers moving into valve opening position and having the loop portions of the flexible elements carried thereby to bring said loop portions in engagement with the valve levers for the actuation of the slides on the valve levers moving into valve closing position.

THELMA T. THIGPEN.